UNITED STATES PATENT OFFICE.

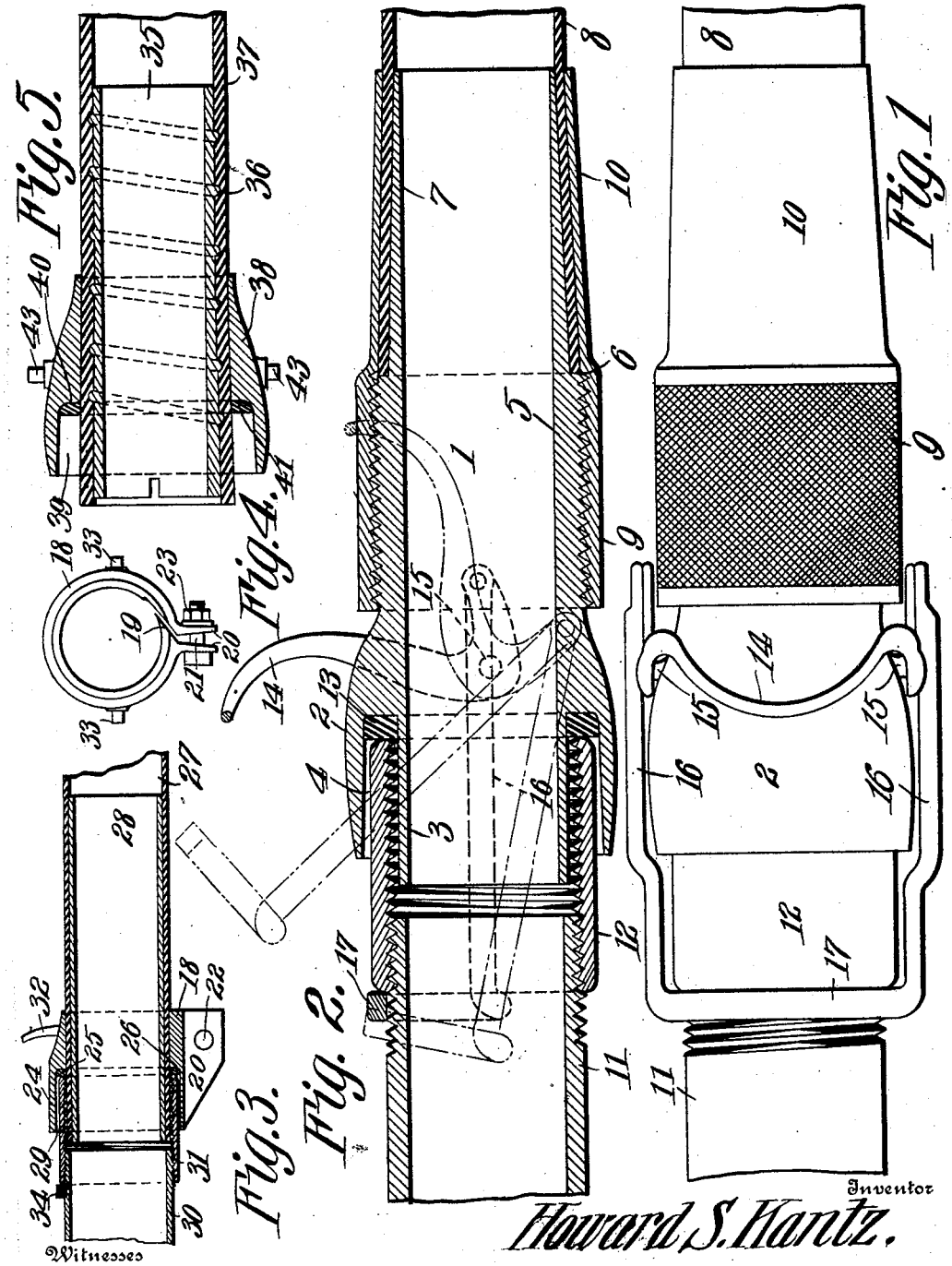

HOWARD S. KANTZ, OF BURNSIDE, PENNSYLVANIA.

COUPLING.

No. 925,483.      Specification of Letters Patent.      Patented June 22, 1909.

Application filed June 3, 1908. Serial No. 436,515.

*To all whom it may concern:*

Be it known that I, HOWARD S. KANTZ, a citizen of the United States, residing at Burnside, in the county of Clearfield and State of Pennsylvania, have invented a new and useful Coupling, of which the following is a specification.

This invention relates to pipe couplings and has especial reference to that class of pipe couplings, which are provided with means for connecting the pipe sections together or unscrewing them.

The invention has for its object to provide an improved pipe coupling of this kind, which can be quickly and securely connected and disconnected and which is especially adapted to secure a rubber pipe or hose to a metal pipe.

The invention consists of pipe coupling constructed and arranged as hereinafter set forth and claimed.

Referring to the drawing, Figure 1 is a view of the invention showing the pipe coupling in locked position. Fig. 2 is a longitudinal section thereof. Fig. 3 is a view in longitudinal section of a modification of the invention. Fig. 4 is a detail view of the coupling clamp in Fig. 3. Fig. 5 is an enlarged view in longitudinal section of a modification of one of the pipe sections in Fig. 3.

In the construction of the coupling a metal tubular pipe coupling section 1 is provided, formed at its forward end with the head 2 in which is located a tubular projection 3 extending slightly beyond the head 2, and having a smooth exterior surface, the projection 3 forming with the interior surface of the head 2 an annular socket 4. The tubular coupling section 1 is formed in the rear with an exterior threaded portion 5 terminating at its rear end in an annular shoulder 6, and having a tapering end portion 7 extending from the shoulder 6. Mounted on and overlapping the end portion 7 of coupling section 1, is the end of a rubber pipe 8, and screwed onto the threaded portion 5 of section 1 is a sleeve 9 having a rearwardly extending tapering smooth portion 10 between which and the portion 7 of section 1 is clamped the end of rubber pipe 8, the latter having its end abutting against the shoulder 6. By means of the tapering end portions 7 and 10, the rubber pipe 8 will be firmly wedged and clamped between them by screwing the sleeve 9 on the section 1, and will be firmly held from pulling apart from the coupling section 1 owing to said tapering ends. 11 is the threaded end of an iron pipe having mounted thereon and projecting beyond the same a threaded sleeve 12, which when the pipe 8 is connected with the pipe 11 projects over the tubular projection 3 against a gasket 13 located in the inner end of the annular socket 4. It will be seen that by means of this construction the gasket 13 is inclosed and will be thoroughly protected, and the gasket seals the connection between the pipe sections. The outer diameter of the tubular projection 3 is less than the inside diameter of the sleeve 12, by reason of which the threads of said sleeve are kept out of contact with said projection, and are thus protected from being injured thereby.

In order to lock the connected pipes together an eccentric U-shaped lever 14 is pivoted on the pivot pins 15 projecting from the sides of head 5, the lever 14 having pivotally connected to its ends the arms 16 of a yoke 17. In Figs. 1 and 2 the coupling is shown in locked position, the yoke 17 engaging the pipe 11 behind the end of sleeve 12, and the lever 14 preferably standing out from the coupling whereby it may be easily handled to quickly unlock the coupling. The position of the lever 14, arms 16 and yoke 17 when unlocked is shown in dotted lines in Fig. 2.

In the modification in Fig. 3 there is provided a tubular pipe coupling head 18, split, as at 19, with the flanges 20, connected by a bolt 21 extending through holes 22 in said flanges and a nut 23 by means of which the head 18 may be clamped in position. The head 18 is formed with a cylindrical socket portion 24 having an internal annular shoulder 25 against which is seated a gasket 26. Extending through the head 18 and projecting slightly beyond the same is the end of a rubber pipe or hose 27 having located within the same a short piece of metal pipe 28 extending to the outer end of pipe 27, and serving as a rigid lining or support. The pipe 27 located in the socket portion 24 forms with the inner surface thereof an annular socket 29. Upon the threaded end of a metal pipe 30 is screwed a sleeve 31 projecting beyond the pipe 30, which when the pipe 27 is connected with the pipe 30 projects over the end of pipe 27 against the gasket 26 at the end of annular socket 29.

It will be seen that by means of the adjustable clamping head 18, the rubber pipe 27 will be tightly clamped to the pipe 28 and held from being drawn out of the head 18. The coupling is locked similarly to that in Figs. 1 and 2 by an eccentric lever 32 pivotally mounted on the pivot pins 33 projecting from head 18, and a yoke 34 engaging pipe 30 behind the end of sleeve 31.

In the modification in Fig. 5, a short metal pipe 35 with a spiral rib 36 on its exterior extending from end to end thereof, is forced into the end of a rubber pipe 37 extending through and projecting slightly beyond a pipe coupling head 38. The head 38 is formed with a cylindrical socket portion 39 having a shoulder 40 against which is seated a gasket 41. By means of the spiral rib 36 on pipe 35, the rubber pipe 37 will be firmly held in the head 38 and prevented from being drawn out therefrom. An eccentric lever is pivoted on the pivot pins 43 projecting from the sides of the head 38 and has a yoke as in the other cases.

Having described the invention, I claim:—

In a pipe coupling, a member having a threaded end, an interiorly threaded sleeve screwed on said end and projecting therefrom, a second member having at its end an annular socket to loosely receive the projecting end of the aforesaid sleeve, the walls of the socket being spaced from the threads of said projected end of the sleeve, and a clamp carried by the socketed member, and engageable with the end of that portion of the sleeve which is screwed on the first mentioned member.

In testimony that I claim the foregoing as my own, I have hereto affixed my signature in the presence of two witnesses.

HOWARD S. KANTZ.

Witnesses:
A. E. WETZEL,
LESTER B. WRIGHT.